(12) United States Patent
Fukumura

(10) Patent No.: US 6,529,227 B1
(45) Date of Patent: Mar. 4, 2003

(54) IMAGE FORMING APPARATUS

(75) Inventor: Atsushi Fukumura, Kyoto (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 0 days.

(21) Appl. No.: 09/505,921

(22) Filed: Feb. 17, 2000

(30) Foreign Application Priority Data

Feb. 22, 1999 (JP) .......................................... 11-043201

(51) Int. Cl.⁷ ............................................. G01D 15/10
(52) U.S. Cl. ..................................................... 347/222
(58) Field of Search ................................ 347/222, 223, 347/172, 170, 108, 138; 271/161, 4.01; 400/208; 358/296; 399/98, 107, 114

(56) References Cited

U.S. PATENT DOCUMENTS

| | | | |
|---|---|---|---|
| 4,695,896 A | * | 9/1987 | Yamanishi .................. 347/172 |
| 5,424,811 A | * | 6/1995 | Haneda ....................... 399/270 |
| 5,528,342 A | * | 6/1996 | Setoriyama ................. 399/107 |
| 5,625,437 A | | 4/1997 | Furukawa .................... 399/107 |
| 5,877,782 A | * | 3/1999 | Imai et al. ...................... 347/3 |
| 5,917,995 A | * | 6/1999 | Ota ............................ 358/1.12 |
| 6,019,362 A | * | 2/2000 | Yazawa ....................... 271/4.01 |
| 6,079,886 A | * | 6/2000 | Kameyama .................. 400/208 |
| 6,084,622 A | | 7/2000 | Sugiura et al. .............. 347/170 |
| 6,089,564 A | * | 7/2000 | Matsumoto et al. ........ 271/161 |

FOREIGN PATENT DOCUMENTS

| | | |
|---|---|---|
| EP | 0-188865 | 7/1986 |
| EP | 0-467264 | 1/1992 |
| JP | 04-346362 | 12/1992 |
| JP | 05-066621 | 3/1993 |
| JP | 07-239594 | 9/1995 |
| JP | 07-281580 | 10/1995 |
| JP | 08-231060 | 9/1996 |
| JP | 09-043929 | 2/1997 |
| JP | 10-327278 | 12/1998 |

* cited by examiner

*Primary Examiner*—N. Le
*Assistant Examiner*—K. Feggins
(74) *Attorney, Agent, or Firm*—Hogan & Hartson LLP

(57) ABSTRACT

An image forming apparatus includes a lower shell that defines an outer contour of the apparatus. A feed roller shaft holding member, a separation roller shaft holding member, a press roller shaft holding member, a platen roller affixing unit, a discharge roller holding member and a pickup roller shaft holding member are all formed integrally with a platform of the lower shell. Left and right frames of the apparatus holds a paper cassette. The left and right frames and the platform are formed integrally with the lower shell.

17 Claims, 4 Drawing Sheets

IMAGE FORMING APPARATUS

BACKGROUND OF THE INVENTION

1. Field of the Invention

The present invention relates to an image forming apparatus provided with a paper supply cassette.

2. Description of the Related Art

Conventionally, image forming apparatuses such as facsimile machines have been provided with a roller holding frame that holds rollers for transporting a document in order to scan An image of it and rollers for transporting recording sheets in order to record an image onto them, and with a paper supply cassette holding frame that holds a paper supply cassette adapted to hold tacks of recording paper. The facsimile machines generally have an external shell that forms the outer shape of the machine, and the above mentioned frames are assembled and supported in the shell.

In these conventional facsimile machines, the roller holding frame and the paper supply cassette holding frame are each assembled separately to the external shell so that mistakes in assembly may occur. Additionally, since there are many parts that must be assembled, assembly of the frames is time consuming.

SUMMARY OF THE INVENTION

It is thus an object of the present invention is to provide an image forming apparatus having a reduced number of parts, and which can be assembled with increased precision.

In order to accomplish this object, according to a first aspect of the present invention, there is provided an image forming apparatus having a roller holding frame that holds rollers provided at a scanning portion and recording portion and a paper supply cassette holding frame that holds a paper supply cassette, characterized in that said frames are formed integrally and made of resin. The number of parts assembled into the image forming apparatus is therefore reduced, and the assembling precision is improved.

The roller holding frame and the paper supply cassette holding frame may be formed integrally with the shell that forms the external shape of the apparatus. This will also reduce the number of parts of the image forming apparatus, and improves the assembling precision.

The paper supply cassette may engage with a member jutting from the paper cassette holding frame, whereby it serves as a bottom wall of the apparatus. Accordingly, the structure of the image forming apparatus is simplified. Further, the apparatus takes up less space than conventional apparatuses having the apparatus bottom wall separate from the paper supply cassette.

BRIEF DESCRIPTION OF THE ACCOMPANYING DRAWINGS

DETAILED DESCRIPTION OF THE INVENTION

An embodiment of the image forming apparatus of the present invention, which is a facsimile machine, will now be described in reference to drawings FIG. 1 through FIG. 4.

Figure 1:
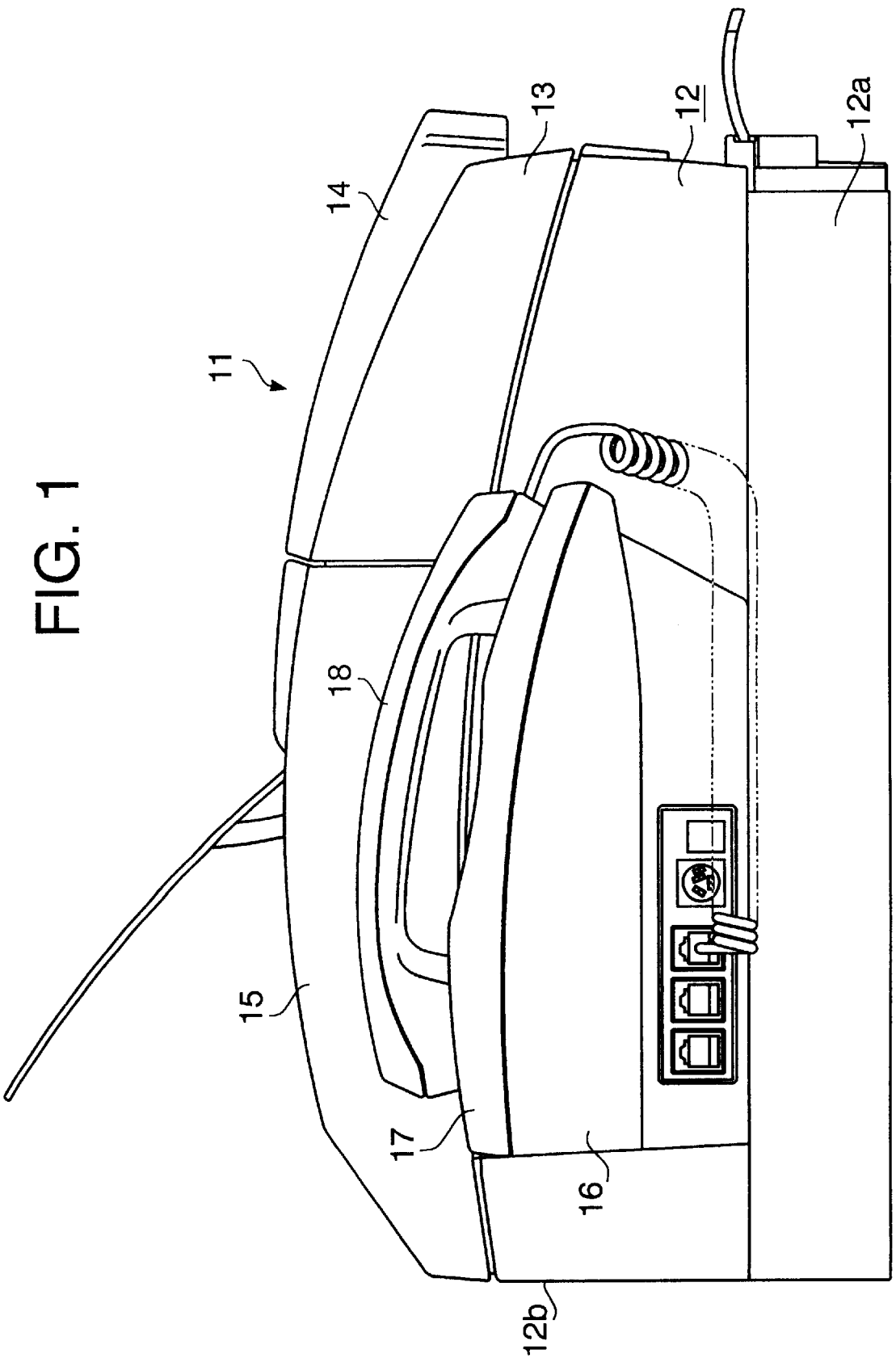
FIG. 1 illustrates a left side peripheral view of a facsimile machine, which embodies the image forming device of the present invention.

Referring to FIG. 1, the contour of the facsimile machine 11 is formed by a lower shell 12, top shell 13 attached to the front top portion of the lower shell 12, control panel and display unit 14 pivotably arranged on the top of the top shell 13, top cover 15 arranged atop the rear portion of the lower shell 12, telephone handset stand support 16 formed integrally with the lower shell 12, and telephone handset stand 17 supported by the stand support 16. A telephone handset 18 is arranged on the telephone handset stand 17.

Figure 3:
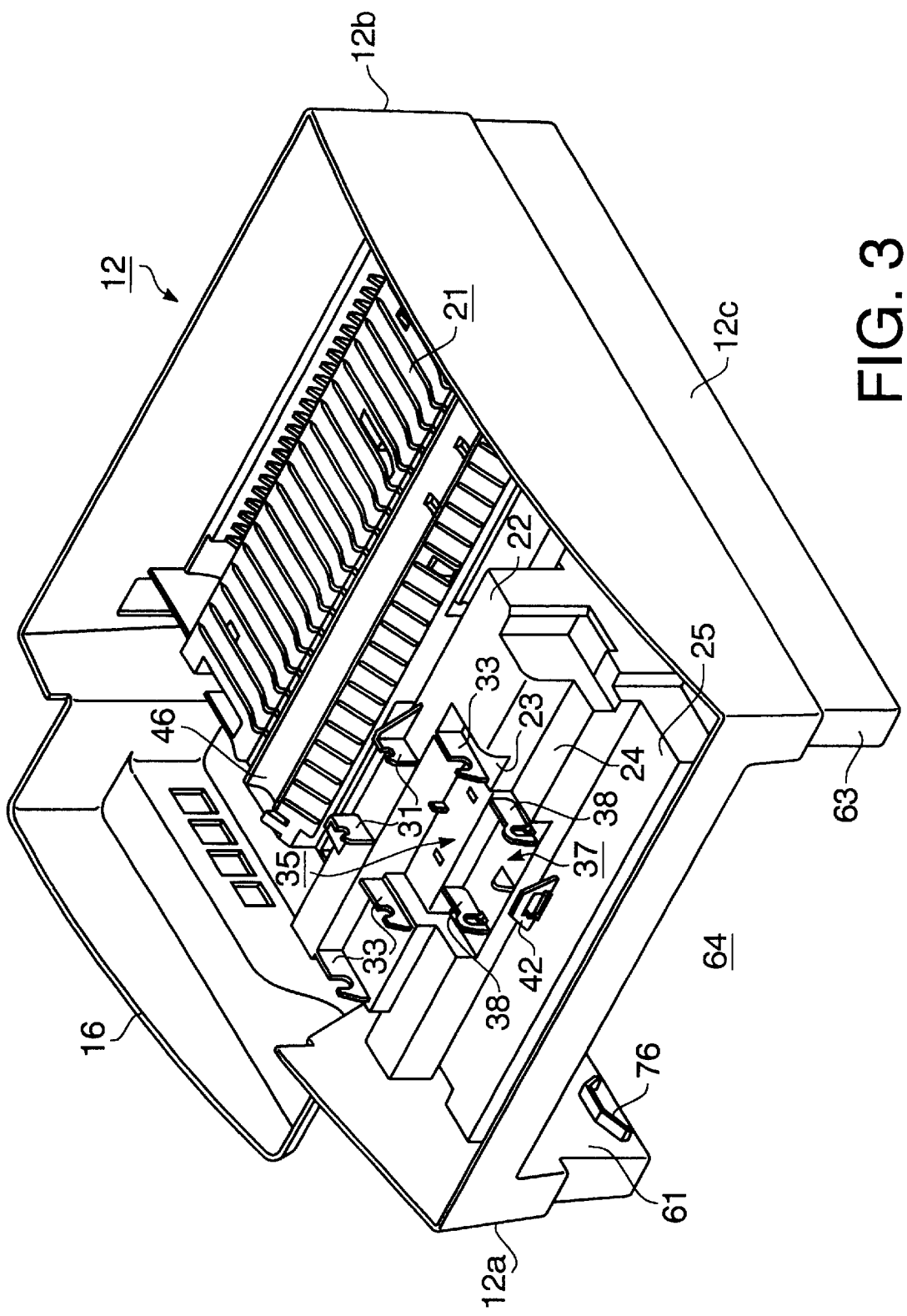
FIG. 3 is a perspective view of a lower shell and associated telephone handset stand support of the facsimile machine shown in FIG. 1.

As can be seen in FIG. 3, the lower shell 12 is formed as an open-top box. The base 21 of the lower shell 12 is formed integrally therewith, and defines a platform that holds the various mechanical parts such as a scanning portion and recording portion. The lower shell base 21 also defines a roller holding frame that holds rollers provided at the scanning and recording portions. The front portion of the top surface of the platform 21 is terraced, forming a first step 22, a second step 23, a third step 24, and a fourth step 25. These steps are integral with the platform 21.

Figure 2:
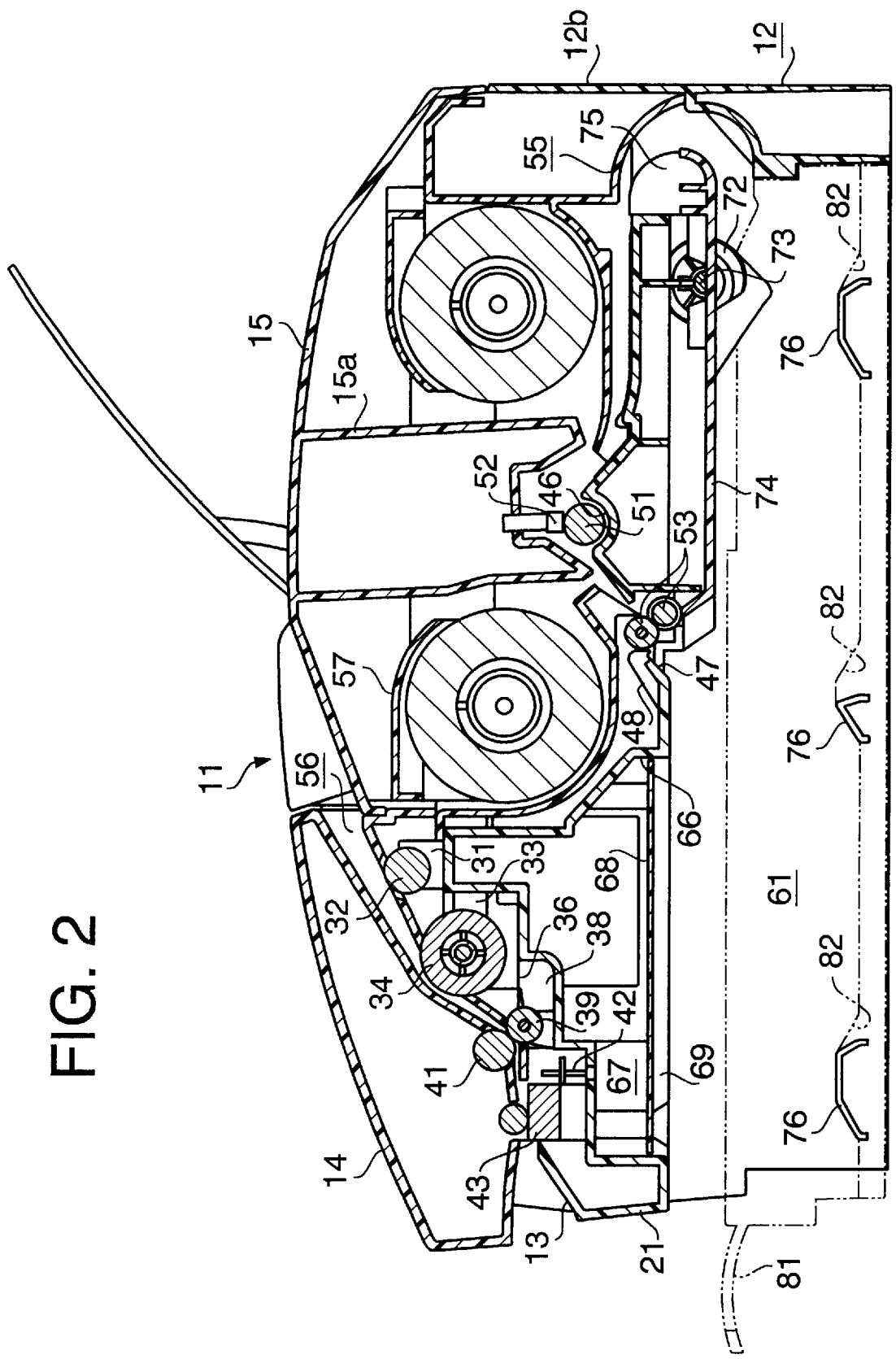
FIG. 2 illustrates a right side cross-section view of the facsimile machine shown in FIG. 1.

A pair of feed roller shaft supports 31 are formed integrally with, and protrude from the first step 22. As shown in FIG. 2, the supports 31 rotatably hold a shaft (not shown in the diagrams) of a feed roller 32 arranged to supply a document.

Similarly, a set of three shaft supports 33, which support a shaft on which a separation roller 34 (shown in FIG. 2) is arranged, protrude from the surface of the second step 23. This shaft is also rotatably supported, allowing the separation roller 34 to rotate and separate individual document sheets such that a plurality of sheets loaded on the machine is fed through one piece at a time. A concave, roughly square spring attachment section 35 is formed approximately in the middle of the second step 23, and a plate spring 36 (shown in FIG. 2) is fixedly attached thereto.

A roughly square, concave press roller reception portion 37 is formed in approximately the middle of the third step 24. A pair of press roller shaft supports 38 that support a shaft of a press roller 39 are formed integrally with the reception portion 37. The shaft is rotatably supported, allowing the press roller 39 to rotate. The press roller 39 is held in pressured contact: with a feed roller 41 arranged in the control panel and display unit 14 through the pressure of the plate spring 36, whereby the press roller 39 is rotated by rotation of the feed roller 41. When the press roller 39 and feed roller 41 rotate together, the document separated by the separation roller is fed forward further.

A scanning portion support section 42 is formed integrally on the fourth step 25 as shown in FIG. 3, and a contact image sensor 43 is supported on the scanning portion holding section 42 as shown in FIG. 2. When the document is fed through, the image sensor emits light at the document, and converts the light reflected therefrom into electric signals.

As understood from the foregoing, the front portion of the lower shell 12, in which the feed roller 32, separation roller 34, press roller 39, and contact image sensor 43 are arranged, is itself covered by the top shell 13.

The surface of the rear portion of the platform 21 is ridged, with the ridges running from back to front in the direction of the paper path. A platen roller holding portion 46 is formed as a semi-circular groove cut laterally across the top of the ridged section. As shown in FIG. 2, paper discharge section 47, which opens downward, and a discharge roller holding member 48 arranged near the paper discharge opening 47 are integrally formed with the platform 21 below the front of the platen roller holding portion 46.

A platen roller 51 is rotatably held in the platen roller holding portion 46, as shown in FIG. 2. The roller 51 is held in opposition to a thermal head 52 supported by a frame 15a extending downward from the top cover 15. A pair of discharge rollers 53 are rotatably held by the discharge roller holding member 48 such that it discharges a printed recording sheet through the paper discharging portion 47.

A separate lower cover 55 is arranged at the back of the lower shell 12, and extends over the platen roller 51 and discharge rollers 53.

The control panel and display 14 is pivotably attached to the top shell 13, allowing it to swing open and close shut. When the panel and display 14 and the top shell 13 are shut, their inner walls form a guide path 56, allowing the passage of a document into the machine.

A thermal transfer film or "donor film" cassette 57 is arranged above of the lower cover 55. A recording sheet and thermal film are nipped between the platen roller 51 and thermal head 52. When the thermal head 52 is heated, ink on the film is melted and transferred to the recording sheet, rendering an image on the recording sheet.

The top cover 15 is pivotably provided over the lower cover 55 under which the thermal transfer film cassette 57 is housed. The top cover 15 is attached such that it opens outwardly around the axis of the pivot point.

Figure 4:
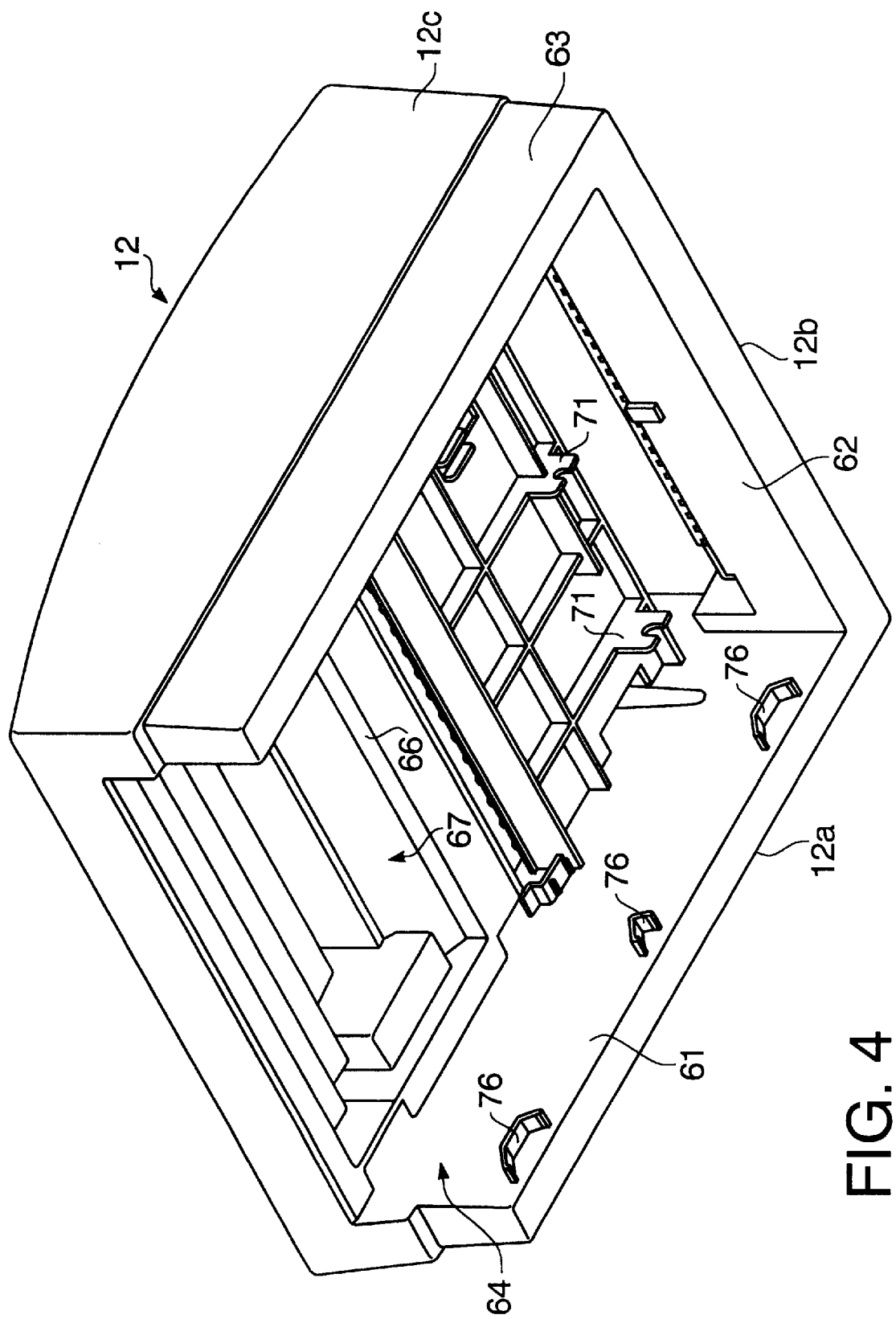
FIG. 4 is another perspective view illustrating the lower shell of the facsimile machine when viewed from the bottom.

As shown in FIG. 4, projecting downwards from the left wall 12a, rear wall 12b, and right wall 12c of the lower shell 12 are left frame 61, rear frame 62, and right frame 63, respectively. These frames 61, 62, 63 are formed integrally with the lower shell 12. A paper supply cassette storage area 64 is formed by the three-sided enclosure created by the three frames 61, 62, 63. Left frame 61 and right frame 63 define the paper supply cassette holding frame.

A step section 66 and a base reception section 67 are formed in the front portion of the lower surface of the platform 21. As shown in FIG. 2, a base plate 69 upon which a base 68 having electronic parts mounted thereto is fixedly attached is arranged in the base reception section 67.

As illustrated in FIG. 4, a plurality of shaft supports 71, each having an inversed U-shaped groove into which fits a pickup roller shaft 73, are formed integrally with the platform 21 so as to protrude downwardly the lower face of the platform 21. As shown in FIG. 2, the pickup roller shaft 73 is supported in the grooves of the supports 71, allowing the shaft 73 to rotate. The shaft 73 passes through pickup roller 72 such that the pickup roller 72 rotates together with the shaft 73 and are restricted from moving along the axial direction of the shaft 73. The pickup roller 72 feeds sheets of paper one sheet at a time toward the platen roller 51.

As shown in FIG. 2, a guide plate 74 is fixedly attached to the rear bottom of the platform 21, where the pickup roller 72 and shaft 73 extend. The guide plate 74 is arranged over the pickup roller shaft 73, and has a semi-circular guide part 75 to guide printing paper towards the platen roller 51.

As depicted in FIG. 4, a plurality of guides and supports 76 are provided on the inward facing surfaces of both the left and right walls 61, 63. These guides and supports 76 are each generally configured like an inversed U, and facilitate the entry of a paper supply cassette 81 with the stacked sheets of recording paper into the paper supply cassette storage area 64. As shown in FIG. 2, when the paper supply cassette 81 is fully inserted into the paper supply cassette storage area 64, these guide supports 76 engage with notches 82 formed on the side walls of the cassette 81, thereby holding the cassette 81 firmly against the bottom shell 12 and left and right frames 61, 63. Once the cassette 81 is inserted, the bottom of the cassette 81 becomes the bottom of the facsimile machine 11. It means that the plate 69 and guide plate 74 are exposed when there is no cassette 81 in the paper supply cassette storage are a 64.

As herein described, the present embodiment offers the following benefits:

(1) All essential structures of the facsimile machine, including the telephone handset stand 16; the support platform 21; the first, second, third, and fourth steps 22, 23, 24, 25; the feed roller shaft supports 31; the separation roller shaft supports 33, the press roller shaft supports 38; the plate spring attachment section 35; the press roller reception portion 37; the scanning portion holding section 42; the platen roller holding portion 46; the discharge roller holding member 48; the pickup roller shaft support 71; the base reception section 67; the left and right frames 61, 63; rear frame 62; and guide supports 76 are formed integrally with the lower shell 12. This dramatically reduces the number of separate or independent parts that must be assembled to make the facsimile machine 11. Further, the chances of misassembly/misalignment are greatly reduced and the assembling precision of the apparatus is significantly improved, if compared with a conventional arrangement in which these parts are prepared separately and assembled later.

(2) When the paper supply cassette 81 is loaded into and supported by the lower shell 12 of the machine 11, the bottom of the cassette 81 defines the bottom of the apparatus 11. Consequently, the structure of the apparatus is simplified, and the amount of space taken up by the machine is reduced if compared with a conventional arrangement in which the cassette bottom is independent of the apparatus bottom.

(3) When the paper supply cassette 81 is removed, the base plate 69 and guide plate 74 of the facsimile machine 11 become exposed. This greatly facilitates maintenance, removal, and replacement of parts, since the plates 69, 74 can be easily removed.

It should be noted that the present invention is not limited to the illustrated and described embodiment, and various changes and modifications may be made without departing from the spirit and scope of the invention. For example, although in the embodiment described herein, the bottom of the paper supply cassette 81 becomes the bottom of the device 11 once it is inserted into the paper supply cassette storage area 64 under the lower shell 12 of the device 11, a bottom wall that forms part of the device 11 may be provided. Further, although the embodiment described herein discloses the lower shell 12 forming the outer shape of the machine being formed integrally with the platform 21 (including the feed roller shaft supports 31; the separation roller shaft supports 33, the press roller shaft supports 38; the platen roller holding portion 46; the discharge roller holding member 48; and the pickup roller shaft support 71) and left and right frames 61, 63 (including the guide supports 76), the platform 21 and frames 61, 63 maybe separated from the lower shell 12 and assembled into the lower shell 12 later. In this case, the platform 21 and frames 61; 63 may be prepared integrally. Moreover, the particular parts integrally formed with the lower shell 12 are merely examples. It is of course feasible not to integrate all of these parts; some of them may be arbitrarily integrated with the lower shell 12. It should also be appreciated that the image forming apparatus need not be restricted to only a facsimile machine, but could be a copier for instance.

The illustrated and described image forming apparatus is disclosed in Japanese Patent Application No. 11-43201 filed on Feb. 22, 1999 and the instant application claims priority of this Japanese Patent Application, the entire disclosure of which is incorporated herein by reference.

What is claimed is:

1. An image forming apparatus, comprising:
   a scanning portion holding section including a scanner that is adapted to read and first rollers;
   a recording portion including a recorder having second rollers;
   a roller holding frame that holds the first rollers provided at the scanning portion holding section and the second rollers provided at the recording portion; and
   a paper supply cassette holding frame that holds a paper supply cassette, wherein said roller holding frame and said paper supply cassette holding frame are formed integrally, and wherein said roller holding frame and said paper supply cassette holding frame are made of resin,
   wherein said roller holding frame and said paper supply cassette holding frame are formed integrally with an outer cover that forms an exterior outer shape of said apparatus,
   wherein the scanning portion holding section is also formed integrally with said roller holding frame and said paper supply cassette holding frame.

2. The image forming apparatus of claim 1, wherein said paper supply cassette engages with members projecting from said paper supply cassette holding frame, and a bottom wall of said paper supply cassette defines a bottom wall of said apparatus.

3. The image forming apparatus of claim 1 wherein said cover includes a telephone receiver holding portion.

4. The image forming apparatus of claim 1, wherein the first rollers provided at the scanning portion include a document feed roller, a document separation roller, and a document discharge roller.

5. The image forming apparatus of claim 1, wherein the rollers provided at the recording portion include a pickup roller that draws out a paper from said paper supply cassette, a platen roller, and a printing paper discharge roller.

6. An image forming apparatus, comprising:
   a lower shell that includes a platform;
   a paper cassette storage area defined by inner walls disposed under the platform, wherein the paper cassette storage area is adapted to hold a paper cassette having a first cover,
   a scanner that is adapted to read and having first rollers;
   a recorder having second rollers, wherein the second rollers comprise a pickup roller that draws out a paper from the paper cassette;
   holding frames on the platform, wherein the holding frames hold both the first rollers and the second rollers, wherein said holding frames and said paper cassette storage area are formed integrally; and
   a second outer cover that fins an exterior outer shape of said apparatus;
   wherein a sheet of paper from the paper cassette is picked up and U-turned via the pickup roller such that the sheet of paper is forwarded to the recorder, and the recorder is set above the paper cassette for printing and discharging onto a sheet tray comprising the first cover.

7. An image forming apparatus according to claims 6, further comprising:
   a base reception section for holding a base/substrate of a microcircuit, wherein the base reception section is molded as a part of an undersurface of the platform; and
   an enclosed frame under the platform that holds the paper cassette, such that when the paper cassette is not installed the enclosed frame is open to the exterior.

8. An image forming apparatus according to claim 6, wherein the paper cassette includes side walls, and further comprising: guide supports formed integrally with the lower shell; and
   notches disposed on the side walls of the paper cassette, wherein the guide supports are adapted to engage the notches to hold the paper cassette.

9. An image forming apparatus, comprising:
   a lower shell that includes a platform;
   a paper cassette storage area defined by inner walls disposed under the platform, wherein the paper cassette storage area is adapted to hold a paper cassette;
   a scanner that is adapted to read and having first rollers;
   a recorder having second rollers, wherein the second rollers comprise a pickup roller that draws out a paper from the paper cassette;
   holding frames on the platform, wherein the holding frames hold both the first rollers and the second rollers, wherein said holding frames and said paper cassette storage area are formed integrally; and
   an outer cover that forms an exterior outer shape of said apparatus;
   wherein a sheet of paper from the paper cassette is picked up and U-turned via the pickup roller such that the sheet of paper is forwarded to the recorder, wherein the recorder is set above the paper cassette for printing and discharging onto a sheet tray within the image forming apparatus.

10. An image forming apparatus according to claim 9, further comprising:
    a base reception section for holding a base/substrate of a microcircuit, wherein the base reception section is molded as a part of an undersurface of the platform; and
    an enclosed frame under the platform that holds the paper cassette, such that when the paper cassette is not installed the enclosed frame is open to the exterior.

11. An image forming apparatus according to claim 9, wherein the paper cassette includes side walls, and further comprising:
    guide supports formed integrally with the lower shell; and
    notches disposed on the side walls of the paper cassette, wherein the guide supports are adapted to engage the notches to hold the paper cassette.

12. An image forming apparatus, comprising:
    an step-shaped surface including a first holding portion that projects upwardly from the step-shaped surface, wherein the first holding portion holds a plurality of rollers provided at a scanning portion;
    a second holding portion that holds a roller provided at a recording portion;
    a frame that defines a paper supply cassette holding portion that holds a paper cassette; and
    a shell that defines at least part of an outer shape of the apparatus;

wherein the step-shaped surface, the second holding portion, the frame and the shell are formed integrally and made of resin.

13. An image forming apparatus according to claim 12, wherein the shell has an open-top box shape.

14. An image forming apparatus according to claim 12, wherein a bottom wall of the shell defines a roller holding base that holds a plurality of rollers provided at a scanning portion and a recording portion.

15. An image forming apparatus according to claim 14, wherein a lower surface of the bottom wall of the shell is exposed when the paper cassette is disengaged, wherein the frame projects downwardly from the shell.

16. An image forming apparatus according to claim 12, wherein the second holding portion comprises a bottom wall of the open-top box-shaped shell, wherein the second holding portion holds a plurality of rollers provided at a scanning portion and at a recording portion.

17. An image forming apparatus, comprising:

an open-top box-shaped shell that defines at least part of an outer shape of the apparatus;

a roller holding base comprising a bottom wall of the open-top box-shaped shell, wherein the roller holding base holds a plurality of rollers provided at a scanning portion and at a recording portion; and a frame that defines a paper supply cassette holding portion which holds a paper cassette such that a lower surface of the bottom wall of the shell is exposed when the paper cassette is disengaged, wherein the frame projects downwardly from the open-top box-shaped shell, wherein the roller holding base, the frame and the open-top box-shaped shell are formed integrally and made of resin.

* * * * *